United States Patent [19]

Akima et al.

[11] Patent Number: 5,433,508
[45] Date of Patent: Jul. 18, 1995

[54] POWERED HEADREST FOR AUTOMOTIVE SEAT

[75] Inventors: Hiroaki Akima; Masakazu Muraishi, both of Akishima, Japan

[73] Assignee: Tachi-S Co., Ltd, Japan

[21] Appl. No.: 139,212

[22] Filed: Oct. 19, 1993

[51] Int. Cl.⁶ ............................................. A47C 7/36
[52] U.S. Cl. ................................. 297/410; 297/391
[58] Field of Search ............ 297/410, 391, 397, 440.1

[56] References Cited

U.S. PATENT DOCUMENTS

| 4,765,683 | 8/1988 | Hattori | 297/410 |
| 5,131,720 | 7/1992 | Nemoto | 297/391 X |
| 5,222,784 | 6/1993 | Hamelin | 297/410 X |

FOREIGN PATENT DOCUMENTS

2057255 4/1981 United Kingdom ................ 297/410

Primary Examiner—Kenneth J. Dorner
Assistant Examiner—Milton Nelson, Jr.
Attorney, Agent, or Firm—Oldham, Oldham & Wilson Co.

[57] ABSTRACT

A powered headrest for an automotive seat, which includes, within a seat back of the seat, a slider member engageable with a stay of the headrest, the slider member being moved vertically by operation of a motor, a rotatable guide rod, and a lock member to be engaged biasingly with a recessed portion of the stay. An operation knob and associated connecting elements are provided in the headrest, with such an arrangement that to simply operate or press the knob will cause rotational motion of the guide rod, and the lock member will only be interlocked with that rotational motion of guide rod, so as to place the headrest stay in an unlocked state with respect to the slider.

8 Claims, 2 Drawing Sheets

POWERED HEADREST FOR AUTOMOTIVE SEAT

BACKGROUND OF INVENTION

1. Field of the Invention

The present invention relates to a powered headrest for use in an automotive seat, and particularly to the structure of a locking device for locking and unlocking a powered headrest which is adjustably moved in a vertical direction to support a head of an occupant on the seat.

2. Description of Prior Art

A powered headrest is operated under control of an electric motor so that its headrest body may be moved upwardly and downwardly relative to the seat back of the automotive seat in an adjustable way.

As generally known, this sort of headrest includes a slider member installed movably therein. The slider member is connected with a motor and a headrest stay. Driving the motor causes vertical movement of the slider member to thereby move the headrest stay in the same vertical direction. Thus, a headrest body provided on the upper free end portion of the headrest stay can be moved vertically to a desired level of height for supporting the head of the occupant on the seat.

To meet the demand for detachability of the headrest body from the seat back for the purpose of changing a seat cover or reclining the seat back to a horizontal line, there have been various locking devices available to permit removing the headrest body from the seat back. Typically, there has been known a locking device having a lock member and a biasing means, wherein the lock member is resiliently biased by the biasing means into engagement with a locking recessed portion formed in the headrest stay. Releasing the lock member from the recessed portion by overcoming the biasing force of the biasing means will allow the headrest body to be removed from the seat back, or conversely, pressing the headrest stay into engagement with the lock member will cause re-engagement of the lock member with the locking recessed portion. In this way, the headrest body may be detachably connected with the foregoing slider in the powered seat.

However, conventionally, this locking/unlocking action has been made by forcibly pressing or pulling the headrest stay into or from the resiliently biased locking member, which results in requiring a pressing/pulling force, on the part of the passenger, and further needing more robust or rigid structure of the slider member sufficient to resist a great load applied thereto, which may in turn result in the slider member being larger in dimensions, weight and higher priced, or making its structure more complicated.

A solution to this problem has been proposed for providing an unlocking mechanism which is operable, as by button operation, to cause forcible disengagement of the locking member from the locking recessed portion of the headrest stay. But, the hitherto type of this unlocking mechanism is of a more complicated structure having a great number of components and parts, and moreover, it only allows the unlocking when the headrest body is located at a most upper point, which will require the operator to re-adjust his or her desired headrest position, each time he or she removes or mounts the headrest body from and onto the seat back.

SUMMARY OF THE INVENTION

In view of the above-stated drawbacks, it is a purpose of the present invention to provide an improved powered headrest for an automotive seat which is simplified in structure and allows the headrest to be easily removed from and mounted to a seat back of the seat.

In order to accomplish such purpose, in accordance with the present invention, a powered headrest is provided, which basically comprises:

a recessed portion formed in a lower end part of a headrest stay of the headrest;

a lock member to be engaged with the recessed portion via a biasing force, the lock member being provided at a slider means with which the headrest stay is engageable;

a guide rod supported rotatably within a seat back of the seat, along which the slider means is movable vertically;

a means for connecting the guide rod with the lock member in an interlocking way such that the lock member will only be interlocked with a rotational motion of the guide rod; and an operation means for causing the rotational motion of the guide rod, the operation means being operable externally of the seat back, wherein, when the guide rod is rotated through the operation means, overcoming the biasing force, the lock member is disengaged from the recessed portion of the headrest stay through said means, so that the headrest stay is placed in an unlocked state with respect to the slider means.

Accordingly, to simply operate the operation means will lock or unlock the headrest to or from the seat back, with the simplified structure.

In one aspect of the invention, such operation means comprises an operation knob attached over an upper end of the guide rod in a manner slidable vertically therealong, a compression (coil) spring means interposed between the operation knob and the upper end of the guide rod, the operation knob being biased by the compression spring means such as to be normally kept projected outwardly of the seat back for access thereto, a rotation preventive means defined between the operation knob and the seat back, by which the operation knob is allowed to be moved along a longitudinal axis of the guide rod without rotation thereabout, a pin integral with the guide rod, a slit means which is formed in a peripheral surface of the operation knob in a slant manner relative to the longitudinal axis thereof, the pin being slidably engaged in the slit means, whereby, upon the operation knob being pushed, the pin integral with the guide rod is caused to slide along the slant slit means, thereby causing the rotational motion of said guide rod.

Preferably, the above-mentioned means may comprise a lock lever and connecting link member, such that the guide rod is operatively connected via those two elements with the lock member.

Preferably, the lock member may be so formed from a leaf spring as to define therein a rectilinear section to be engaged with the recessed portion of the headrest stay, a curved section partly fitted to the slider means and a generally U-shaped projected section with which the foregoing connecting link member may be connected for interlocking with the lock lever.

The operation knob and guide rod should preferably be formed in a non-circular shape, respectively, with regard to a support body like a base bracket and the foregoing lock lever, so as to realize the above-stated simple pressing operation of the knob and allow free vertical movement of the lock lever along the guide rod without rotation thereabout, yet permitting both lock lever and guide rod to be rotated integrally.

DETAILED DESCRIPTION OF PREFERRED EMBODIMENT OF THE INVENTION

Figure 1:
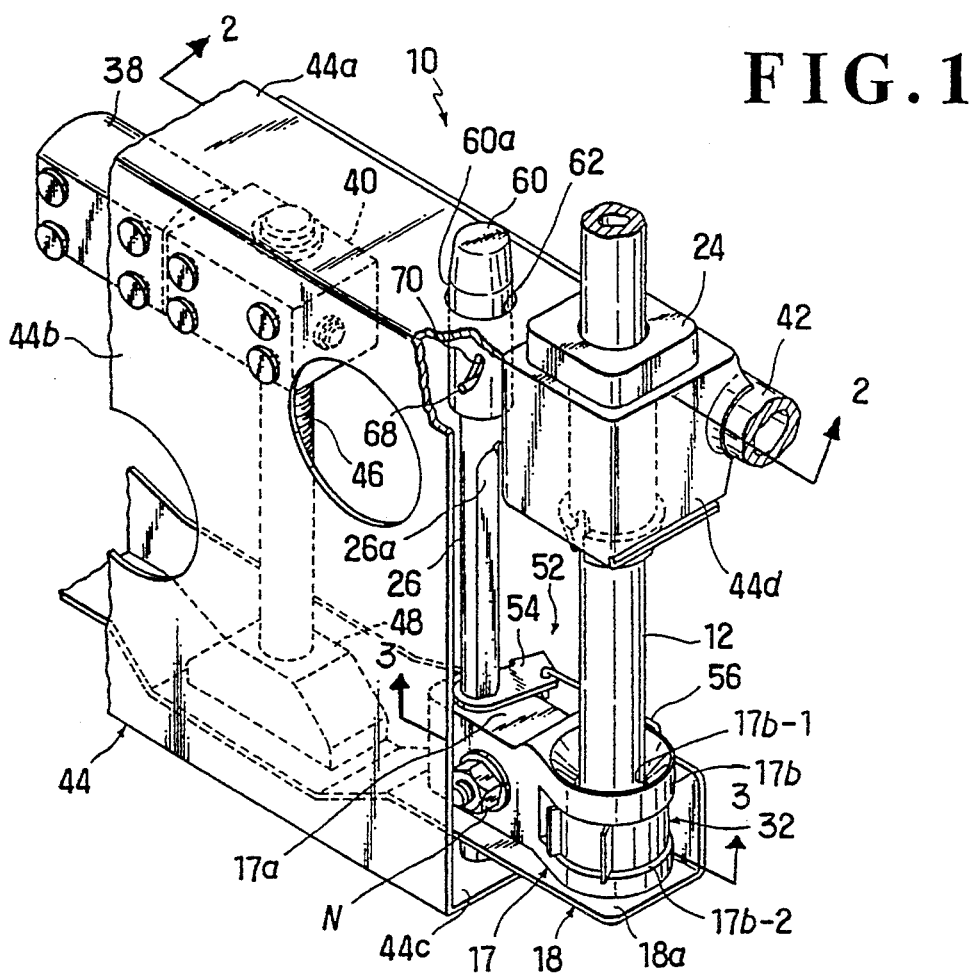
FIG. 1 is a partly broken, schematic perspective view of a powered headrest with a lock device in accordance with the present invention.
Figure 2:
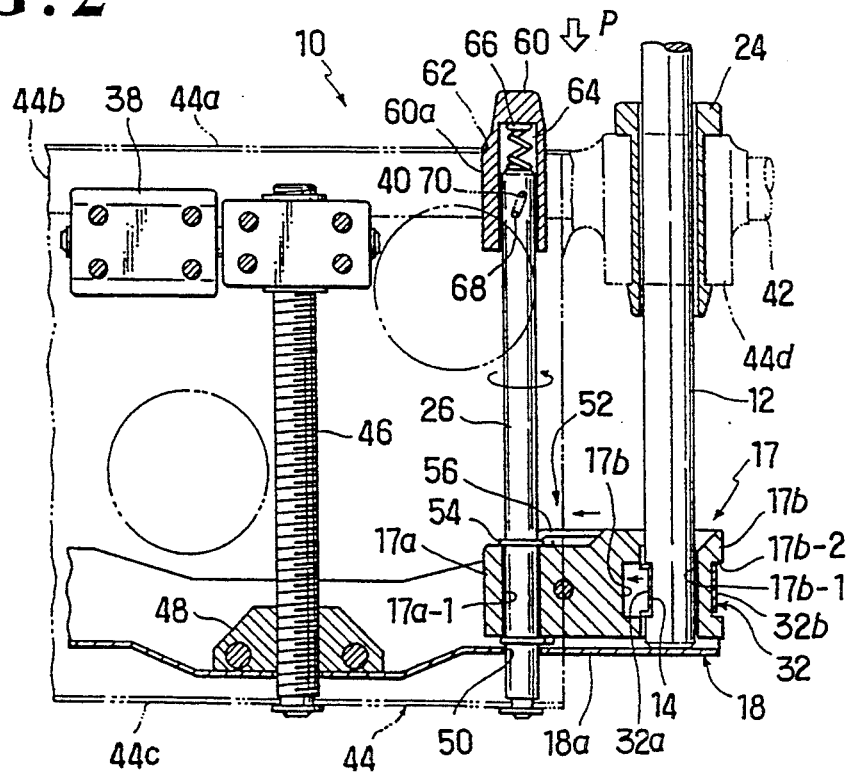
FIG. 2 is a schematic, longitudinally sectional view of the powered headrest.
Figure 5:
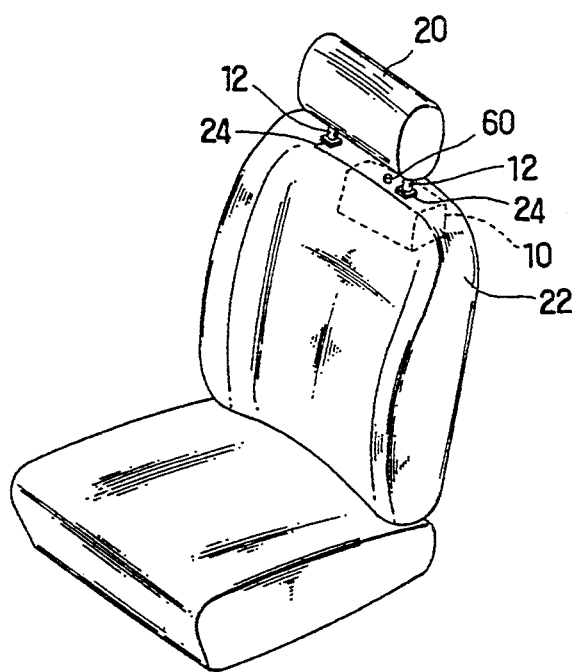
FIG. 5 is a schematic perspective view of an automotive seat with the powered headrest mounted therein.

Referring to FIGS. 1, 2 and 5, there is illustrated one embodiment of a powered headrest in accordance with the present invention, which is provided within the seat back (22) of an automotive seat.

Particularly, designated generally by (10) is a locking device, in accordance with the present invention, for locking and unlocking a headrest body (20) to and from the seat back (22).

As can be seen from FIGS. 1 and 2, the basic construction of the powered headrest is such that a box-like base bracket (44) (or motor panel) is fixed to a seat back frame (42), with both outer threaded screw spindle (46) and guide rod (26) being extended vertically within the base bracket in parallel with each other, and a slider member (18) is threadedly engaged at its central portion with the screw spindle (46) via an internally threaded nut member (48). The upper end of the screw spindle is connected with an electric motor (38) via a gear box (40). The motor (38) is fixed on the inner wall of the frontal surface of the base bracket (44), and both ends of the screw spindle (46) and guide rod (26) are rotatably connected to the bottom surface of base bracket (44). The slider member (18) has an opening (50) through which the guide rod (26) passes. Provided on a lateral side (18a) of the slider member (18) is a locking member (32) to be resiliently engaged with a recessed portion (14) formed in the lower end part of a headrest stay (12). Although not shown, as in the state of art, such lateral side (18a) of slider member (18) is provided with a holder means to which the locking member (32) is mounted as well as which receives the lower end of headrest stay (12). But, in favor of the illustrated embodiment of the present invention, such holder means is not shown, and instead thereof, a holder member (17) is presented as a preferred improved element in accordance with the present invention. As will be explained later in detail, the holder member (17) includes a portion (17b) corresponding to that lower holder, yet with a different structure therefrom.

At a lateral end of the top surface (44a) of the base bracket, there is formed a box-like bracket portion (44d) in which a stay holder (24) is fitted.

Thus, the headrest stay (12) may be inserted through the stay holder (24) and locked to the slider member (18), with the recessed portion (14) thereof being engaged by the locking member (32). Operation of the motor (38) will cause rotation of the screw spindle (46) to move the slider member (18) upwardly and downwardly along the longitudinal direction of the guide rod (26), whereby the headrest body (20) may be adjusted in height with respect to the seat back (22). This is a known structure for ordinary headrests, and not limited to this particular one. Any further explanation will therefore not be made thereof.

Now, a specific description will be given as to the locking device (10) in accordance with the present invention, which is applied to the above-stated basic structure of the powered headrest.

Figure 3:
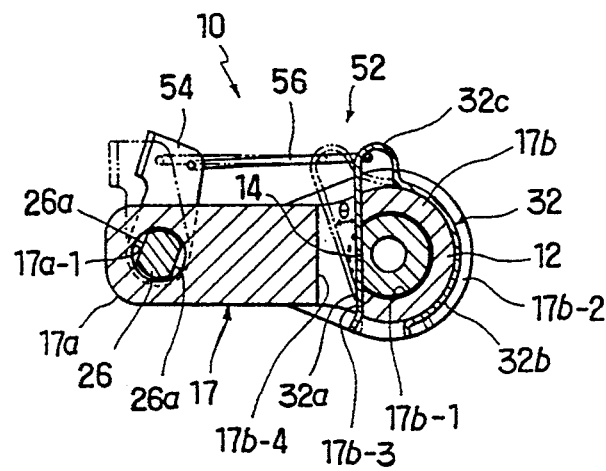
FIG. 3 is a schematic, cross-sectional view of a part of the lock device provided in the powered headrest.

Designation (17) represents a holder member fixed to the lateral side (18a) of slider member (18), as viewed from FIGS. 1 and 2. The holder member (17) consists essentially of a guide portion (17a) and a stay holder portion (17b). As best shown in FIGS. 2 and 3, those guide and stay holder portions (17a) (17b) are formed with a guide rod through-hole (17a-1) and a stay through-hole (17b-1), respectively, so that the guide rod (26) passes through the former through-hole (17a-1), while the lower end of headrest stay (12) may be inserted and received in the latter one (17b-1). As can be seen from FIGS. 1 and 4, the holder member (17) is securely mounted on the slider member (18) by means of a securing screw (S) and nut (N). In this embodiment shown, while the guide portion (17a) assumes a generally cubic shape, the stay holder portion (17b) is of a generally cylindrical configuration.

Such stay holder portion (17b) is so formed as to define therein a recessed outer peripheral area (17b-2) of a generally semicircular shape in crosssection, an inner flat wall portion (17b-3) inwardly of the recessed outer peripheral area (17b-2), and an inner spacing area (17b-4). The inner spacing area (17b-4) is defined between the foregoing guide portion (17a) and this particular stay holder portion (17b).

It should be noted here that the inner flat wall portion (17b-3) lies flush with the surface of recessed portion (14) of headrest stay (12), as seen best from FIG. 3, thus providing a continuous flat surface portion for receiving the lock price or rectilinear section (32a) of the locking member (32) to be explained later. Of course, in the case that the headrest stay (12) is not inserted in the stay holder portion (17b), only the inner flat wall portion (17b-3) thereof receives such locking member rectilinear section (32a).

As shown, the locking member (32) is made of a leaf spring and formed by a semicircular section (32b), a generally U-shaped projected section (32c) and the above-stated rectilinear section (32a) in an integral way.

The locking member (32) is engaged about the cylindrical stay holder portion (17b) of holder member (17) such as to cause fitting of both semicircular and rectilinear sections (32b)(32a) thereof onto the recessed outer peripheral area (17b-2) and inner flat wall portion (17b-3) of the cylindrical stay holder portion (17b), respectively, as shown in FIG. 3. With this arrangement, a locking mechanism is constituted for allowing the headrest stay (12) to be locked, at its recessed portion (14), with respect to the slider member (18). The U-shaped projected portion (32c) of locking member (32) is projected outwardly of the stay holder portion (17b), as shown.

In addition to the locking mechanism, there is provided an unlocking mechanism as generally designated by (52), which comprises the foregoing guide rod (26) as a part of its components, a lock lever (54) workable only in association with the rotational operation of the guide rod (26) as will be explained later, a connecting link member (56) which connects the lock lever (54) with the aforementioned U-shaped projected portion (32c) of locking member (32), and an operation knob (60) which caps the upper end part of guide rod (26) in such a way as to be rotatable about and slidable along the longitudinal axis of the same guide rod (26).

The lock lever (54) is shown to be formed in a generally U shape, having a pair of leg portions, each extending over the respective upper and lower sides of the guide portion (17a) and terminating in an end with a non-circular hole (54a) having an opening dimension slightly larger than the corresponding non-circular cross-section of the guide rod (26). In this respect, it should be noted that two flat surfaces (26a)(26a) are formed on the opposite sides of guide rod (26) that originally has a circular cross-section, thereby providing such "non-circular" cross-section thereof, and that the holes (54a) of lock lever (54) are each formed in a dimension substantially equal to that non-circular cross-section of rod (26). Hence, the lock lever (54) is connected with the rod (26), without any idle or loose rotation therebetween, so that a revolution of the guide rod (26) is surely transmitted to the lock lever (54) for simultaneous rotation for an unlocking purpose to be set forth later.

Figure 4:
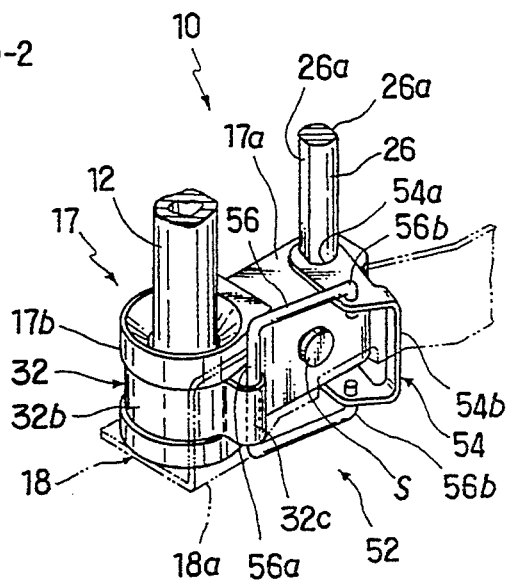
FIG. 4 is a partly broken, schematic perspective view showing a part of the lock device, in particular, a holder member from the back side thereof as well as constituent parts of the lock device in the powered headrest.

The connecting link member (26) is also shown to be formed in a generally U shape, having a central section (56a) and a pair of lateral sections (56b)(56b), each extending from both ends of the central section (56a) continuously. As best shown in FIG. 4, the central section (56a) is engaged with the projected section (32c) of the lock member (32), whereas the two ends of paired lateral sections (56b)(56b) are pivotally connected to the outwardly projected free end part (54b) of lock lever (54).

The operation knob (60), which has a circular cross-section, comprises a rotation-preventive protrudent part (60a) projected outwardly therefrom, an inner hollow portion (64) formed therein, and an elongated hole (70) formed aslant in one peripheral surface thereof (see FIG. 1). In the inner hollow portion (64), the upper end part of the guide rod (26) is inserted movably, with such an arrangement that a compression coil spring (66) is accommodated in the hollow portion (64), laying between the inner bottom wall of the hollow portion (64) and the upper end of rod (26), and that a pin (68) projected from the upper end part of guide rod (26) is inserted through the foregoing elongated hole (70). The spring (66) biases the knob (60) in the upward direction, keeping it projected from the base bracket (44) normally.

The knob (60) exposes its top portion and its protrudent part (60a) partially through the non-circular hole (62) formed in the upper wall (44a) of base bracket (44). Hole (62) is formed in such a non-circular way conforming to an outer configuration obtained from both peripheral surface and protrudent part (60a) of the knob (60). Accordingly, the knob (60) per se, by virtue of its rotation-preventive part (60a), is prevented against rotation in the hole (62), while being allowed to move vertically through the same hole (62).

The elongated hole (70) should be formed in a proper slant manner with respect to the vertical axis of the knob (60), as indicated in FIG. 2, so that pressing the knob (60) downwardly in the arrow direction (P) will cause the pin (68) to slide upwardly along the elongated hole (70), which in turn causes rotation of the guide rod (26) in the counterclockwise direction. With this motion, the lock lever (54) is also rotated in the same counterclockwise direction, thereby pulling the projected section (32c) of lock member (32) via the connecting link member (56) in the right direction as indicated by the arrow in FIG. 2. Consequently, as shown by the two-dot chain lines in FIG. 3, the rectilinear section (32a) of lock member (32) is displaced away from the recessed portion (14) of headrest stay (12) at the angle of $\theta$ relative to the flat wall portion (17b-3) associated with the holder member (17), whereby the headrest stay (12) is placed in an unlocked state with respect to the holder member (17) and thus, the headrest body (20) may be removed from the seat back (22).

Then, releasing such pressure on the operation knob (60) permits the knob body to be moved upwardly due to the expanding biasing force of spring (66), which causes the pin (68) to slide downwardly along the elongated hole (70), whereby both guide rod (26) and lock lever (54) are caused to rotate in the clockwise direction, allowing thus the lock member rectilinear section (32a) to return to the home position where it is engaged with the recessed portion (14) of stay (12) and/or the flat wall portion (17b-3) associated with the holder member (17).

It is important that the elongated hole (70) be formed to have optimal length and slant angle in relation to the longitudinal axis of knob body (60) such as to complete rotation of the lock lever (54) for displacing the lock member rectilinear section (32a) at the angle of $\theta$.

In this context, the above-stated flat surfaces (26a)(26a) formed in the guide rod (26) should be of a proper length corresponding to the range of vertical movement of the slider member (18).

Accordingly, it is appreciated that, to simply press the knob (60) with a small force will transform its vertical motion into the rotational motion of the guide rod (26), thereby forcibly expanding the elastic lock member (32) to disengage the rectilinear section (32a) thereof from the headrest stay recessed portion (14).

In accordance with the present invention, the locking and unlocking operation for the headrest stay is extremely simplified by the pressing operation of the knob, and since the lock member may be opened by such knob operation, no forcible contact exists between the headrest stay and lock member, not only when inserting the stay into the holder member, but also when removing the same therefrom. This apparently prevents the slide member (18) from being given any excessive load, thus allowing for a more light-weight and small-sized slide member with a simple structure.

Further, as the guide rod (26) is utilized as a part of the unlocking mechanism (52), the number of component parts is reduced, contributing to the simplified structure of the device.

Moreover, the lock lever (54) is not only connected to the guide rod (26) in a positive interlocking relation therewith, but also slidable vertically along the guide rod (26), so that, irrespective of the slider member (18) being located at any point in its height position, the unlocking rotation caused from the operation knob (60) is surely transmitted via the lock lever (54) to the lock member (32), thus placing the headrest stay (12) in an unlocked state. This allows the headrest body (20) to be freely removed from or mounted onto the seat back, without need to set the headrest body (20) at a given height point as found in the prior art.

It should be understood that the present invention is not limited to the illustrated embodiments, but any other modifications, replacements and additions may be applied thereto structurally without departing from the scopes and spirits of the appended claims. For instance, the operation knob (60) may be a rotary type of knob, instead of the pushing type described above, so that an operator can directly rotate the guide rod (26) by rotating the knob (60). The two opposite flat portions (26a)(-26a) defined on the guide rod (26) for rotation-preventive purpose may be formed along the whole length of the rod (26). A separate lock piece may be attached to the rectilinear section (32a) of lock member (32), so that the lock piece will be engaged into or disengaged from the recessed portion (14) of headrest stay (12). The guide rod (26) may be disposed at any position within the seat back (22) to permit choice of a best location of the knob (60) upon the seat back (22) in terms of aesthetic appearance of the seat.

What is claimed is:

1. A powered headrest for an automotive seat, which is mounted on a seat back of the seat, including a headrest stay, a slider means engageable with said headrest stay, and a guide rod, wherein said slider means is movable vertically via said guide rod within said seat back, and wherein operation of a motor causes vertical movement of said slider means along said guide rod so as to move the headrest vertically upon said seat back, said powered headrest comprising:

a recessed portion formed in a lower end part of said headrest stay;

a lock member to be engaged with said recessed portion via a biasing force, said lock member being provided at said slider means;

wherein said guide rod is rotatably supported within said seat back;

a means for connecting said guide rod with said lock member in an interlocking way such that said lock member will be interlocked for rotational motion with said guide rod; and an operation means for causing the rotational motion of said guide rod, said operation means being operable externally of said seat back, wherein, when said guide rod is rotated through said operation means, overcoming said biasing force, said lock member is disengaged from said recessed portion of said headrest stay so that said headrest stay is placed in an unlocked state with respect to said slider means, 2. The powered headrest according to claim 1, wherein said lock member is provided with a lock piece for engagement with said recessed portion of said headrest stay.

3. The powered headrest according to claim 1, wherein said means for connecting said guide rode with said lock member comprises a lock lever and a connecting link member, wherein said lock lever is provided with a hole through which said guide rod passes, thereby connecting said lock lever with said guide rod, wherein said connecting link member connects said lock lever with said lock member wherein said guide rod has, formed therein, a non-circular rotation-preventive portion corresponding to at least a range within which said slider means is movable vertically along said guide rod, and wherein said hole of said lock lever is formed in a shape generally conforming to said non-circular portion of said guide rod, whereby said lock lever is not only slidable along a longitudinal axis of said guide rod, but also rotatable with said guide rod integrally without idle rotation therebetween.

4. The powered headrest according to claim 3, wherein said lock member is so formed from a leaf spring as to define therein a rectilinear section to be directly engaged with said recessed portion of said headrest stay, a curved section connected partly with said slider means, and a generally U-shaped projected section, and wherein said lock lever is connected with said generally U-shaped projected section of said lock member by means of said connecting link member, to thereby allow said lock member to be interlocked with for rotational motion there with said guide rod.

5. The powered headrest according to claim 4, wherein said rectilinear section of said lock member is provided with a lock piece for engagement with said recessed portion of said headrest stay.

6. The powered headrest according to claim 1, wherein said operation means comprises an operation knob attached over an upper end of said guide rod in a manner slidable vertically therealong, a compression spring means interposed between said operation knob and said upper end of said guide rod, said operation knob being biased by said compression spring means such as to be normally kept projected outwardly of said seat back for access thereto, a rotation-preventive means associated with said operation knob, by which said operation knob is allowed to be moved along a longitudinal axis of said guide rod without rotation thereabout, a pin integral with said guide rod, a slit means which is formed in a peripheral surface of said operation knob in a slant manner relative to the longitudinal axis thereof, said pin being slidably engaged in said slit means, whereby, upon said operation knob being pushed, said pin integral with said guide rod is caused to slide along said slant slit means, thereby causing said rotational motion of said guide rod.

7. The powered headrest according to claim 6, wherein said rotation-preventive means comprises a non-circular shape of hole formed in a base bracket provided within said seat back, and a non-circular peripheral surface formed on said operation knob, which conforms generally to said non-circular shape of hole, and wherein said guide rod is rotatably supported by said base bracket.

8. The powered headrest according to claim 7, wherein said non-circular peripheral surface of said operation knob is defined by forming a protrudent portion on a peripheral surface of said operation knob.

* * * * *